United States Patent [19]
Nanko

[11] Patent Number: 6,146,298
[45] Date of Patent: Nov. 14, 2000

[54] BAND ADAPTER FOR FRONT DERAILLEUR

[75] Inventor: Yoshiaki Nanko, Sakai, Japan

[73] Assignee: Shimano, Inc., Osaka, Japan

[21] Appl. No.: 09/280,085

[22] Filed: Mar. 29, 1999

[51] Int. Cl.[7] .................................. F16H 9/00; F16H 7/22
[52] U.S. Cl. .............................................. 474/80; 474/127
[58] Field of Search ................................ 474/69, 70, 78, 474/79, 80, 82, 119, 122, 127; 280/261

[56] References Cited

U.S. PATENT DOCUMENTS

| | | | |
|---|---|---|---|
| 5,620,384 | 4/1997 | Kojima et al. | 474/82 |
| 5,779,581 | 7/1998 | Fujii | 474/82 |

FOREIGN PATENT DOCUMENTS 197 30 933  8/1998  Germany .

*Primary Examiner*—David Fenstermacher
*Assistant Examiner*—Matthew A. Kaness
*Attorney, Agent, or Firm*—Shinjyu Global IP Counselors, LLP

[57] ABSTRACT

A band adapter is provided for adapting a front derailleur of a bicycle to smaller sized frame tube. The front derailleur has a fixed member or tubular coupling member that is adapted to be coupled to the seat tube of the bicycle, a chain guide for shifting the chain of the bicycle and a linkage assembly coupled between the tubular coupling member and the chain guide. The band adapter is coupled to the tubular coupling member to decrease the effective clamping diameter of the tubular clamping member. In the preferred embodiment, the band adapter includes an adapting member and a band retaining member which are coupled to the tubular clamping member of the front derailleur for easy installation. The adapting member includes a first adapter with a first curved portion and a second adapter with a second curved portion. The band retaining member includes a first retainer with the first adapter coupled thereto and a second retainer with the second adapter coupled thereto. Preferably, the first and second retainers are constructed of a non-metallic material, while the first and second adapters are constructed of a metallic material. Preferably, the first and second retainers preferably have one or more elastically deformable abutments or hooks.

16 Claims, 7 Drawing Sheets

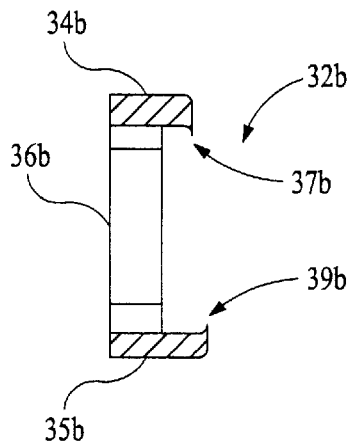 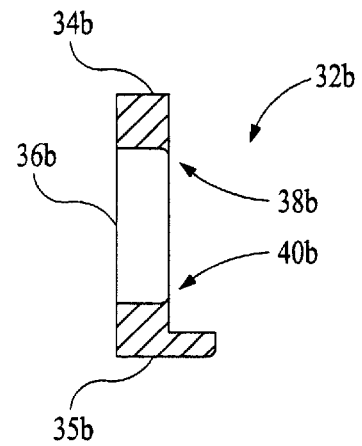
FIG. 17  FIG. 18
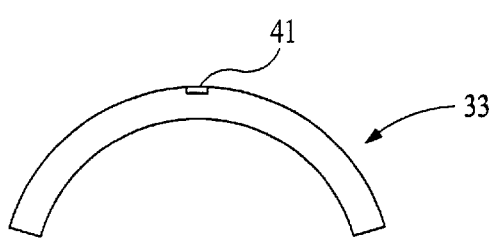
FIG. 19
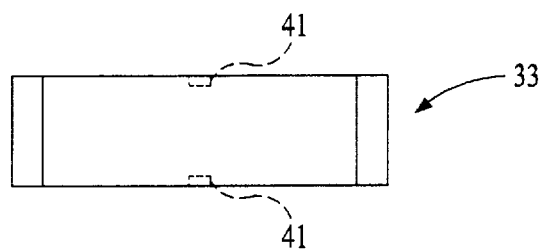
FIG. 20
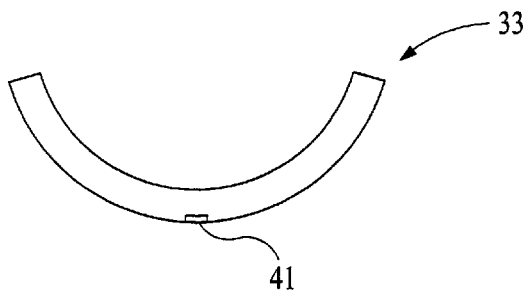
FIG. 21

BAND ADAPTER FOR FRONT DERAILLEUR

BACKGROUND OF THE INVENTION

1. Field of the Invention

This invention generally relates to a band adapter for a front derailleur of a bicycle. More specifically, the present invention relates band adapter for a front derailleur of a bicycle that allows the front derailleur to be used with different sizes of bicycle frames.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One part of the bicycle that has been extensively redesigned is the frame of the bicycle. In fact, each bicycle manufacturer may have several different frame designs. This presents a problem for many bicycle component manufacturers as well as for bicycle shops that carry a full line of bicycle components.

One component that is mounted to the bicycle frame is the front derailleur. Generally speaking, the front derailleur is typically secured to the seat tube of the bicycle frame. Basically, the front derailleur includes a fixed member nonmovably secured to the seat tube of the bicycle frame, and a movable section supported to be movable relative to the fixed member. The movable section supports a chain guide having a pair of vertical surfaces for contacting a chain.

The fixed member of the front derailleur is typically a tubular clamping member that encircles the seat tube of the bicycle such that the chain guide is located above the front sprockets. Since bicycle frames have a wide variety of configurations with different diameters of seat tubes, this has required bicycle component manufacturers to supply a different front derailleur for each manufacturer's frame. More specifically, the tubular clamping member of each of the front derailleurs must be made with a size according to the customer's seat tubed diameter. Typically, seat tube diameters come in three sizes. The large size diameter of seat tube is approximately 34.9 millimeters. The medium size seat tube diameter is typically approximately 31.8 millimeters. The small sized seat tube diameter is typically approximately 28.6 millimeters in diameter. This has created the problem of manufacturing, stocking and controlling inventory for at least three different kinds of front derailleur to meet the various requirements of the bicycle frame manufacturers. Moreover, in bicycle shops that supply parts, the shop has to keep all front derailleurs as replacement parts so that the dealer can sell a front derailleur for any bike with any different tube diameter.

One product that has been developed to overcome this problem is an aluminum band adapter that can be used with a front derailleur in order to allow it to be used for different tube diameters. One problem with this prior art band adapter is that it is difficult to install. In particular, the band adapter must be held on the front derailleur during assembly. This is very inconvenient when assembly a large number of front derailleurs on bicycles.

In view of the above, there exists a need for a band adapter for a front derailleur of a bicycle, which overcomes the above mentioned problems in the prior art. This invention addresses this need in the prior art as well as other needs, which will become apparent to those skilled in the art from this disclosure.

SUMMARY OF THE INVENTION

One object of the present invention is to provide a band adapter for a front derailleur of a bicycle that can be used with many different sizes of bicycle frames.

Another object of the present invention is to provide a band adapter that is easy to install on the bicycle when installing the front derailleur.

Still another object of the present invention is to provide a band adapter that is lightweight.

The foregoing objects can basically be attained by providing a band adapter for a tubular clamping member. The band adapter has an adapting member and a retaining member. The adapting member has an outer surface and a curved inner surface with a predetermined radius of curvature. The retaining member is coupled to the adapting member, and has a coupling member to fixedly secure the retaining member to the tubular clamping member.

The foregoing objects can basically be attained by providing a front derailleur for a bicycle comprising a tubular clamping member, an adapter member, a band retaining member, a chain guide and a linkage assembly. The tubular clamping member is adapted to be coupled to a portion of the bicycle. The chain guide has a chain receiving slot to shift a chain of the bicycle in a transverse direction. The linkage assembly is coupled between the chain guide and the fixed member to move the chain guide between a retracted position and an extended position.

The band adapter decreases the effective clamping diameter of a tubular clamping member. The adapting member having an outer surface and a curved inner surface with a predetermined radius of curvature. The retaining member is coupled to the adapting member. The retaining member has a coupling member to fixedly secure the retaining member to the tubular clamping member.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 17 is a cross-sectional view of the second band adapter as seen along section lines 17—17 of FIG. 15;

FIG. 18 is another cross-sectional view of the second retainer illustrated in FIGS. 13–17 as seen along section lines 18—18 of FIG. 15;

FIG. 19 is a top plan view of one of the adapters for the band adapter illustrated in FIGS. 2–5;

FIG. 20 is an inside elevational view of the adapter illustrated in FIG. 19 for the band adapter illustrated in FIGS. 2–5;

FIG. 21 is a bottom plan view of the adapter illustrated in FIGS. 19 and 20 for the band adapter illustrated in FIGS. 2–5;

DETAILED DESCRIPTION OF THE PREFERRED EMBODIMENTS

Figure 1:
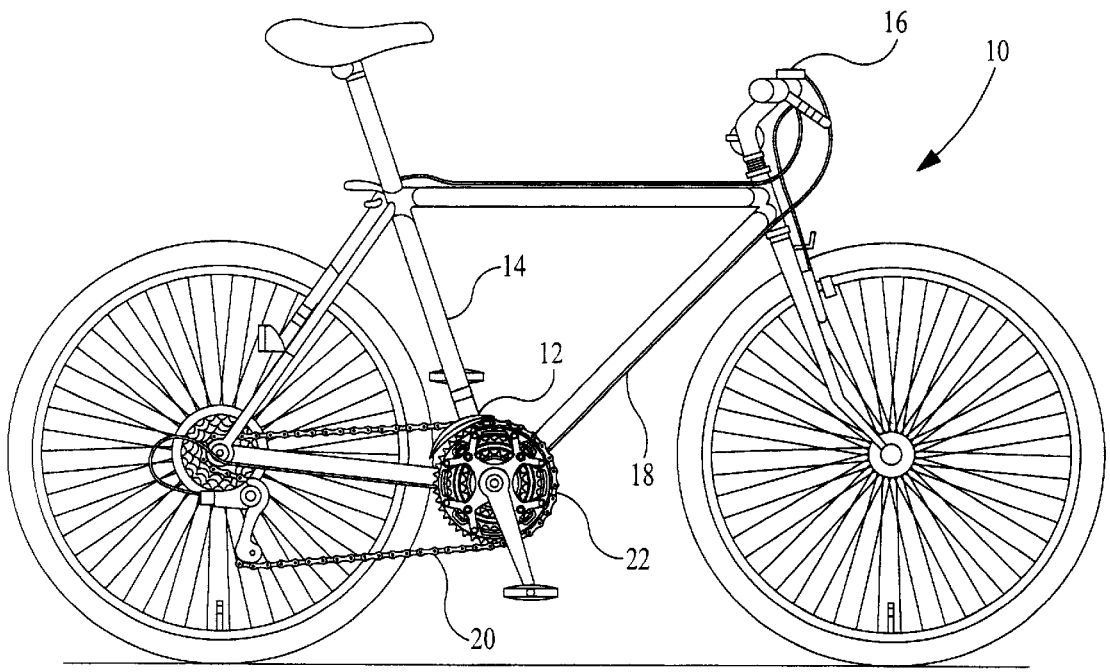
FIG. 1 is a side elevational view of a conventional bicycle with a front derailleur coupled to the seat tube in accordance with one embodiment of the present invention.
Figure 2:
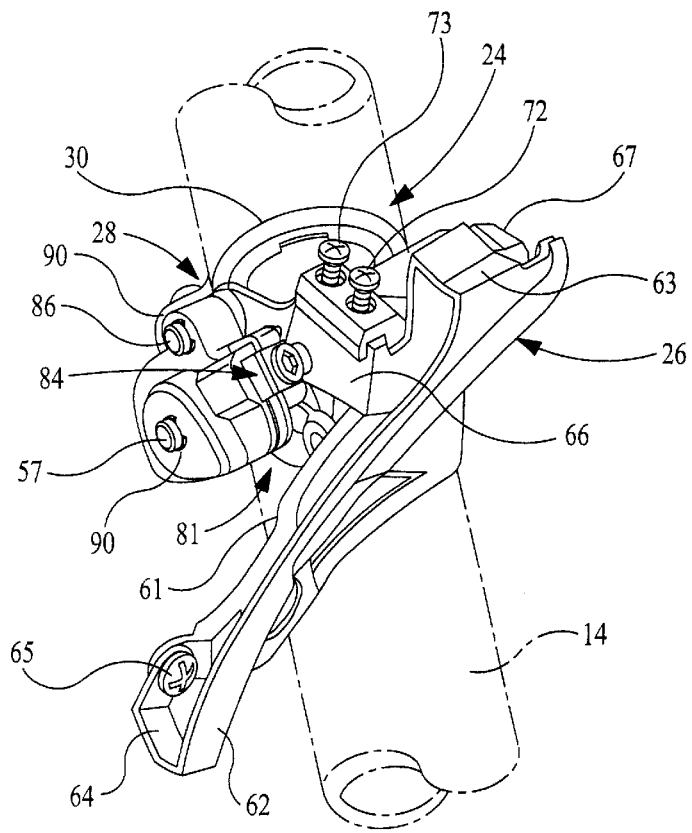
FIG. 2 is a perspective view of the front derailleur coupled to the seat tube of the bicycle frame by a band adapter in accordance with one embodiment of the present invention.

Referring initially to FIGS. 1 and 2, a bicycle 10 is illustrated with a front derailleur 12 fixedly coupled to its seat tube 14 of its frame. The front derailleur 12 is operated by shifting unit 16 via a shift cable 18 to move chain 20 between the front sprockets 22 of the drive train. Front derailleur 12 in accordance with the present invention is designed to accommodate a wide variety of bicycle frames.

Bicycles and their various components are well known in the art, and thus, bicycle 10 and its various components will not be discussed or illustrated in detail herein except for the components that relate to the present invention. In other words, only front derailleur 12 and the components that relate thereto will be discussed and/or illustrated herein.

As used herein, the terms "forward, rearward, upward, above, downward, below and transverse" refer to those directions of a bicycle in its normal riding position, which front derailleur 12 is attached. Accordingly, these terms, as utilized to describe the front derailleur 12 in the claims, should be interpreted relative to bicycle 10 in its normal riding position.

Figure 5:
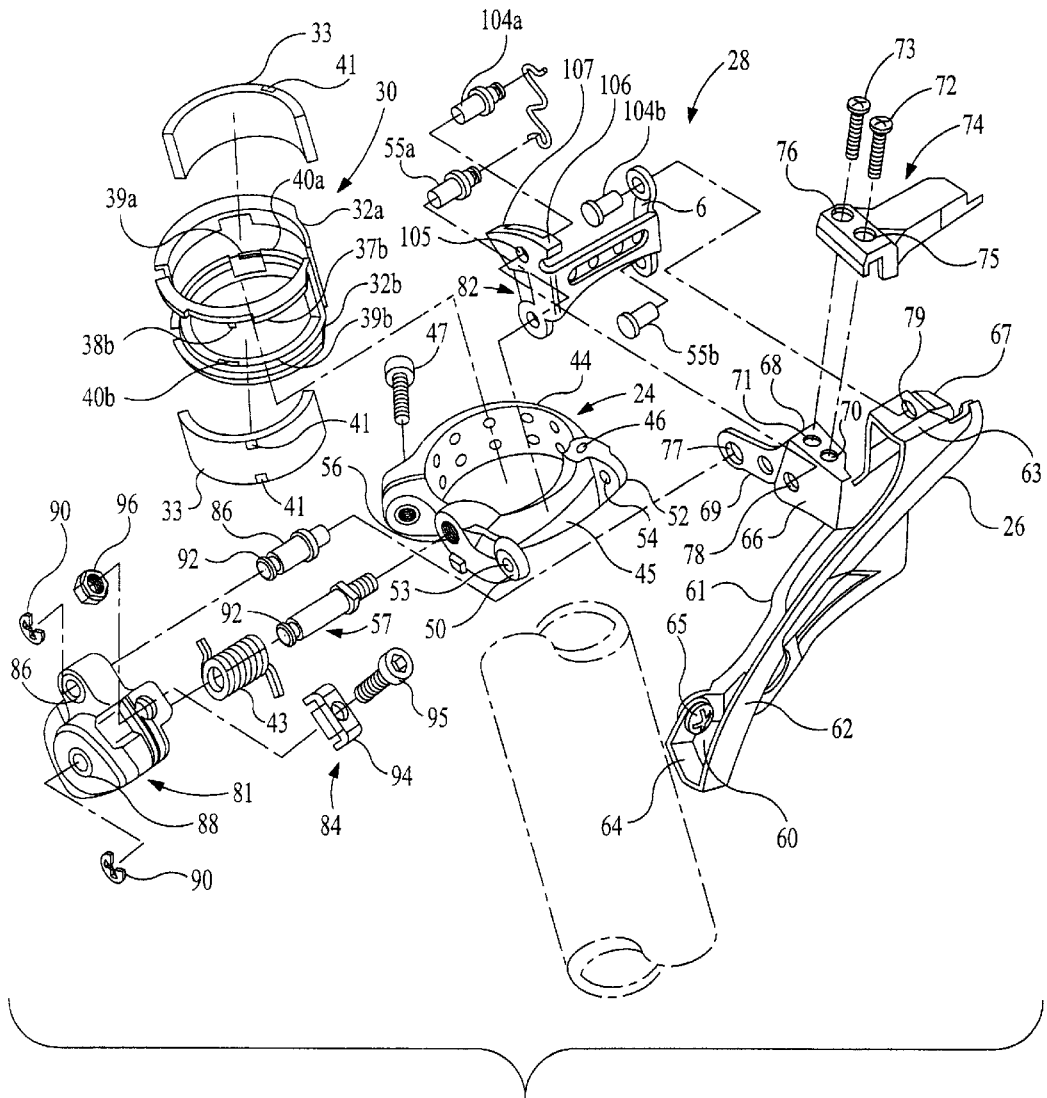
FIG. 5 is an exploded perspective view of selected parts of the front derailleur and the band adapter illustrated in FIGS. 2–4 in accordance with the present invention.

Basically, front derailleur 12 includes a fixed or tubular clamping member 24, a chain guide 26 and a linkage assembly 28 coupled between tubular clamping member 24 and chain guide 26. Tubular clamping member 24 is provided with a band adapter 30 for decreasing its effective inner diameter so that front derailleur 12 can be installed on smaller size seat tubes. As best seen in FIGS. 2 and 5, tubular clamping member 24 is located beneath chain guide 26 and linkage assembly 28 such that chain guide 26 moves from a retracted (low gear) position to an extended (high gear) position.

As seen in FIG. 5, linkage assembly 28 is preferably designed such that biasing member (torsion spring) 43 normally biases chain guide 26 in a transverse direction towards the frame of bicycle 10. In other words, when chain guide 26 is closest to the frame of bicycle 10, chain guide 26 holds chain 20 over the sprocket 22 that is closest to seat tube 14.

Referring to FIGS. 1 and 2 together, when linkage assembly 28 holds chain guide 26 in its extended position, chain guide 26 is located over the outermost sprocket 22, i.e., the furthest sprocket 22 from seat tube 14. These movements of chain guide 26 and linkage assembly 28 are controlled by shifting unit 16. Specifically, when the rider squeezes the lever of shifting unit 16, this pulls shift cable 18 to move chain guide 26 between its extended position and its retracted position via linkage assembly 28. Shifting unit 16 can be a variety of types of shifting units. Therefore, the precise structure of shifting unit 16 will not be discussed or illustrated in detail herein.

Figure 3:
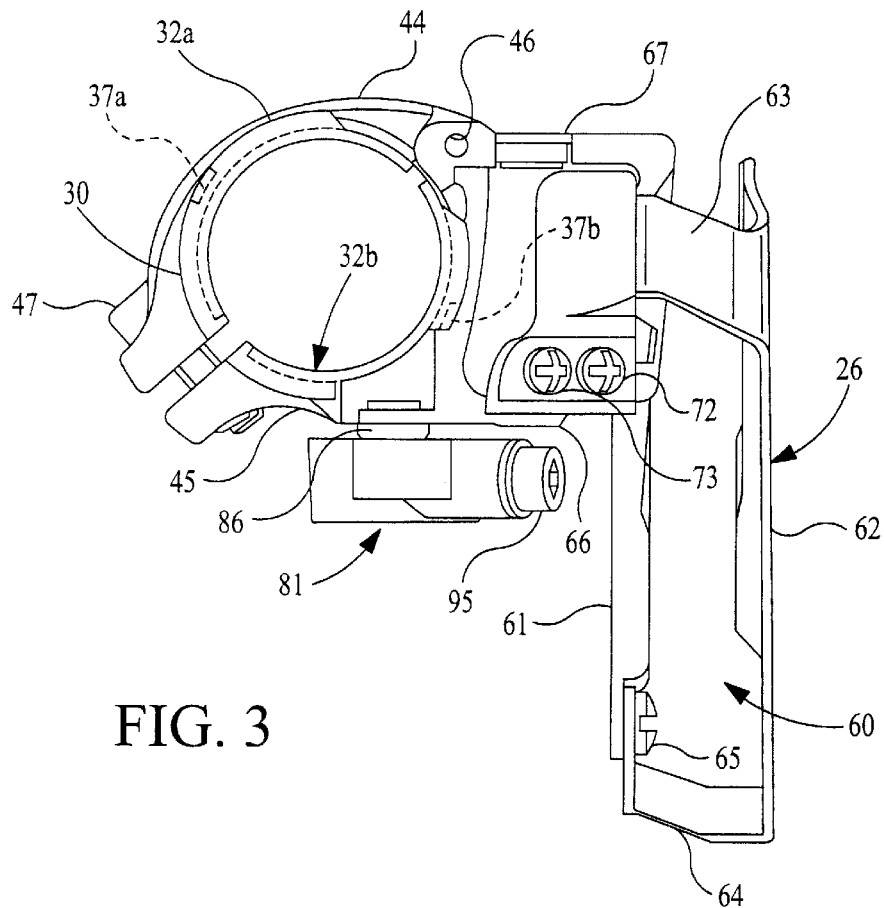
FIG. 3 is a top plan view of the front derailleur illustrated in FIG. 2 with the band adapter of the present invention coupled thereto.
Figure 4:
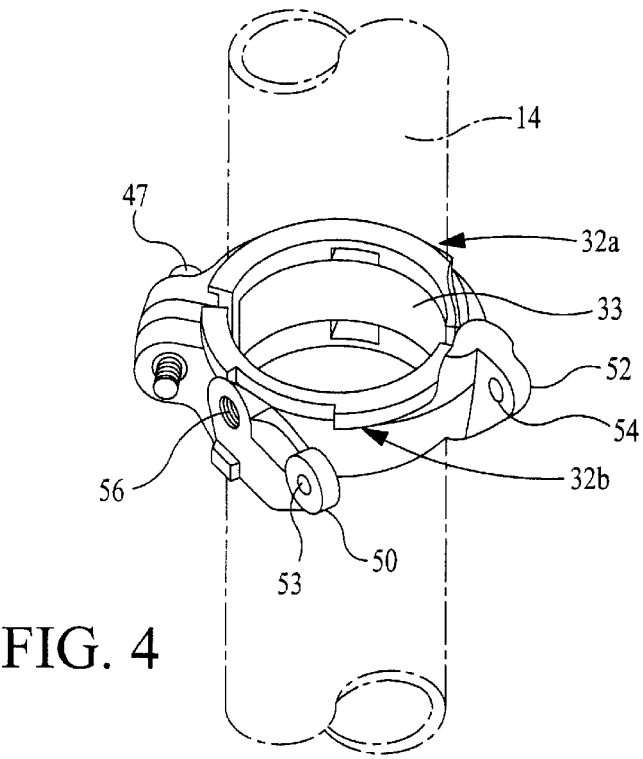
FIG. 4 is a perspective view of the tubular clamping member of the front derailleur and the band adapter of the present invention coupled thereto.

As best seen in FIGS. 3–5, tubular clamping member 24 is preferably clamped directly to the seat tube 14. Tubular clamping member 24 basically includes a first C-shaped clamping portion 44, a second C-shaped clamping portion 45, a pivot pin 46 and a fastener 47. First and second clamping portions 44 and 45 are constructed of a rigid material to secure front derailleur 12 to seat tube 14 of bicycle 10. Preferably, clamping portions 44 and 45 are constructed of metal. Of course, clamping portions 44 and 45 could be constructed of other materials such as a hard rigid plastic material. In the illustrated embodiment, the clamping portions 44 and 45 are constructed by utilizing conventional manufacturing techniques such as casting or machining. Of course, clamping portions 44 and 45 can also be constructed from sheet metal.

Still referring to FIGS. 4 and 5, band adapter 30 basically includes a first retainer 32a, a second retainer 32b and a pair of identical adapters 33. First retainer 32a is adapted to clip on to first clamping portion 44 of tubular clamping member 24, while second retainer 32b is adapted to be clipped on to second clamping portion 45 of tubular clamping member 24. Basically, first and second retainers 32a and 32b are C-shaped members that together form a band retaining member, while the two adapters 33 together form an adapting member that is coupled to the band retaining member to decrease the effective inner diameter of tubular clamping member 24.

In the preferred embodiment, first and second retainers 32*a* and 32*b* are constructed of a non-metallic material such as a hard, resilient resin material or plastic. Adapters 33, on the other hand, are constructed of a metallic material. Preferably, adapters 33 are constructed from aluminum. Accordingly, this arrangement of non-metallic and metallic materials create an adapter that is lightweight and easily installed on the tubular planting member 24, while containing an effective clamping force on the seat tube 14 of bicycle 10. The adapters 33 can have either a smooth surface or a rough surface formed by sand blasting or the like.

As best seen in FIGS. 6–12, first retainer 32*a* is a seat C-shaped member having an upper curved portion 34*a*, a lower curved portion 35*a* and a pair of connecting portions 36*a* extending between upper curved portion 34*a* and lower curved portion 35*a*. These portions 34*a*–36*a* define an opening or recess for receiving one of the adapters 33 therein. Preferably, this opening or recess is sized to retain one of the adapters 33 therein, as discussed below.

Figure 6:
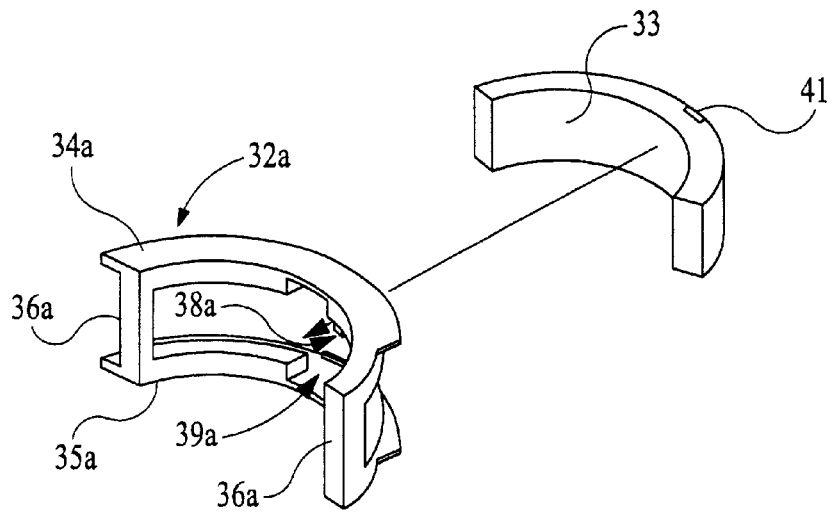
FIG. 6 is an exploded perspective view of one of the retainers and one of the adapters of the band adapter illustrated in FIGS. 2–5.
Figure 7:
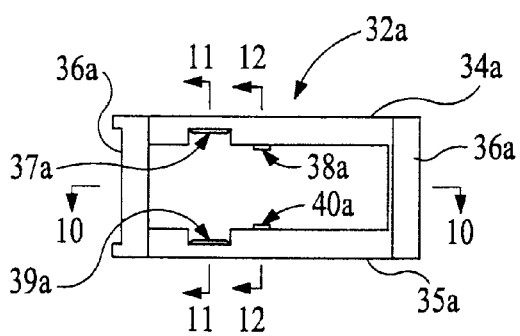
FIG. 7 is an inside elevational view of a first retainer which is illustrated in FIG. 6 for the band adapter illustrated in FIGS. 2–5.
Figure 8:
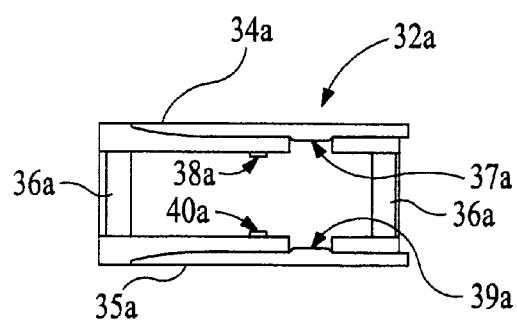
FIG. 8 is an outside elevational view of the first retainer illustrated in FIGS. 6 and 7 for the band adapter illustrated in FIGS. 2–5.
Figure 9:
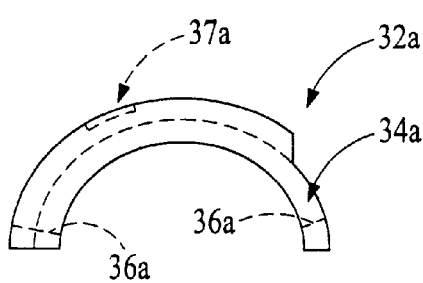
FIG. 9 is a top plan view of the first retainer illustrated in FIGS. 2–8 for the band adapter illustrated in FIGS. 2–5.
Figure 10:
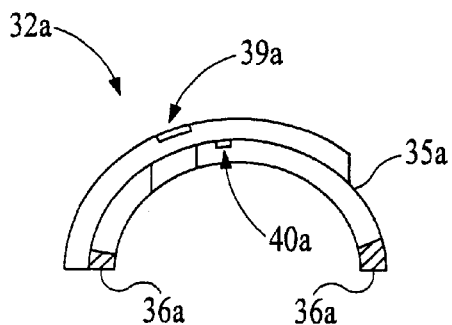
FIG. 10 is a longitudinal cross-sectional view of the first retainer illustrated in FIGS. 6–9 as seen along section line 10—10 of FIG. 7.
Figure 11:
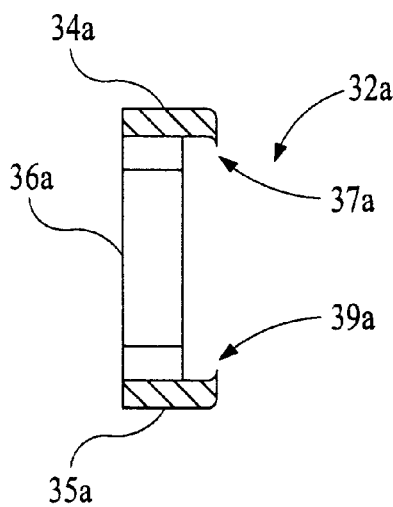
FIG. 11 is a transverse cross-sectional view of the first retainer illustrated in FIGS. 6–10 as seen along section line 11—11 of FIG. 7.
Figure 12:
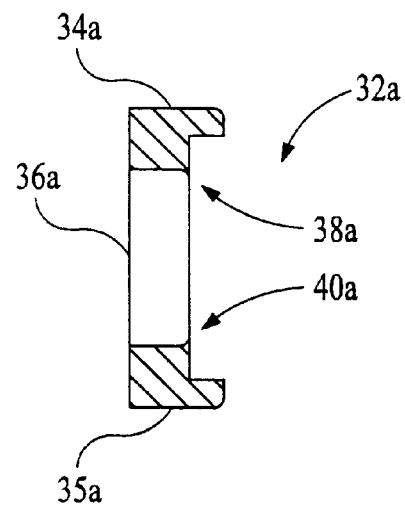
FIG. 12 is a transverse cross-sectional view of the first retainer illustrated in FIGS. 6–11 as seen along section lines 12—12 of FIG. 7.
Figure 13:
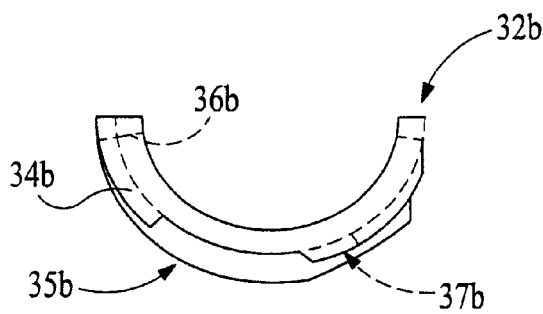
FIG. 13 is a top plan view of the second retainer for the band adapter illustrated in FIGS. 2–5.
Figure 14:
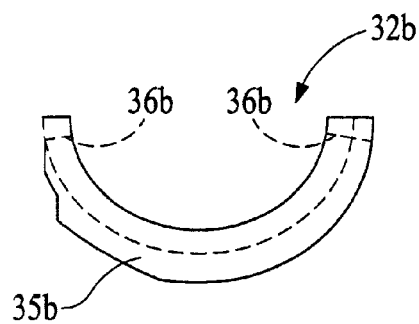
FIG. 14 is a bottom plan view of the second retainer illustrated in FIG. 13 for the band adapter illustrated in FIGS. 2–5.
Figure 15:
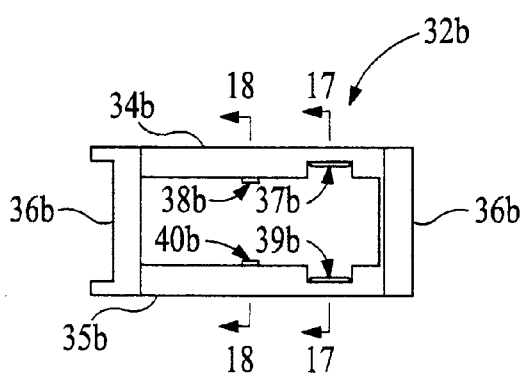
FIG. 15 is an inside elevational view of the second retainer illustrated in FIGS. 13 and 14 for the band adapter illustrated in FIGS. 2–5.
Figure 16:
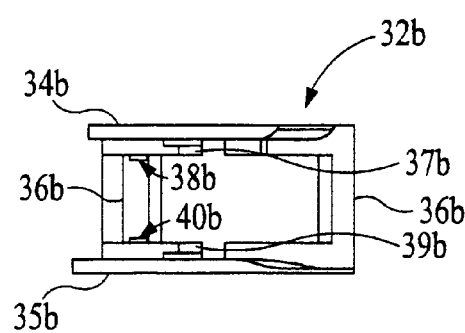
FIG. 16 is an outside elevational view of the second retainer illustrated in FIGS. 13–15 for the band adapter illustrated in FIGS. 2–5.

As best seen in FIGS. 6, 11 and 12, upper curved portion 34*a* has an L-shaped cross-section along most of its length for resting on the top of clamping portion 44. Upper curved portion 34*a* is provided with a substantially centrally located retaining abutment (detent) or hook 37*a*. Retaining abutment or hook 37*a* is adapted to be clipped on to the top of clamping portion 44 of tubular clamping member 24. In other words, a curved space is formed on the upper curved portion 34*a* for receiving a part of clamping portion 44 therein. Preferably, first retainer 32*a* is constructed of a material that can be elastically deformed to clip first retainer 32*a* onto clamping portion 44 of tubular clamping member 24. Upper curved portion 34*a* is also provided with an abutment (detent) or tab 38*a* for engaging adapter 33 to limit outward movement of adapter 33 relative to first retainer 32*a*.

Lower curved portion 35*a* is similar to upper curved portion 34. Lower curved portion 35*a* is clipped onto the bottom of clamping portion 44 of tubular clamping member 24. Lower curved portion 35*a* includes a retaining abutment (detent) or hook 39*a* for engaging and coupling clamping portion 44 of tubular clamping member 24 thereto. The lower curved portion 35*a* also has another abutment (detent) or tab 40*a* that engages the bottom of adapter 33 to limit the outward movement of adapter 33 relative to first retainer 32*a*.

The retaining abutments 37*a* and 39*a* form a coupling member that is designed to snap-fit onto the upper and bottom parts of clamping portion 24. More specifically, first retainer 32*a* is elastically deformed by the coupling of first retainer 32*a* onto clamping portion 44. Since retaining abutments or hooks 37*a* and 39*a* are relatively small, the amount of resiliency or elastic deformation of first retainer 32*a* does not have to be very large. In other words, first retainer 32*a* can be constructed of a relatively rigid material with a limited amount of resiliency or flexibility. The retaining abutments 37*a* and 39*a* are vertically opposed to each other on their respective portions 34*a* and 35*a*.

Likewise, tabs 38*a* and 40*a* are also vertically opposed to one another. Tabs 38*a* and 40*a* form a coupling member that is designed to snap-fit onto the upper and bottom parts of adapter 33. More specifically, first retainer 32*a* is elastically deformed by the coupling one of the adapters 33 onto first retainer 32*a*. Accordingly, adapter 33 is fixedly secured to first retainer 32*a*, and first retainer 32*a* is fixedly secured to clamping member 24.

As best seen in FIGS. 13–18, second retainer 32*b* is a seat C-shaped member having an upper curved portion 34*b*, a lower curved portion 35*b* and a pair of connecting portions 36*b* extending between upper curved portion 34*b* and lower curved portion 35*b*. These portions 34*b*–36*b* define an opening or recess for receiving one of the adapters 33 therein. Preferably, this opening or recess is sized to retain one of the adapters 33 therein.

As best seen in FIGS. 17 and 18, the upper curved portion 34*b* has an L-shaped cross-section along most of its length for resting on the top of clamping portion 45. Upper curved portion 34*b* is provided with a substantially centrally located retaining abutment (detent) or hook 37*b* as seen in FIG. 17. Retaining abutment or hook 37*b* is adapted to be clipped on to the top of clamping portion 45 of tubular clamping member 24. In other words, a curved space is formed on the upper curved portion 34*b* for receiving a part of clamping portion 45 therein. Preferably, second retainer 32*b* is constructed of a material that can be elastically deformed to clip second retainer 32*b* onto clamping portion 45 of tubular clamping member 24. Upper curved portion 34*b* is also provided with an abutment (detent) or tab 38*b* for engaging adapter 33 to limit outward movement of adapter 33 relative to second retainer 32*b* as best seen in FIG. 18.

Lower curved portion 35*b* is similar to upper curved portion 34*b*. Lower curved portion 35*b* is clipped onto the bottom of clamping portion 45 of tubular clamping member 24. As seen in FIG. 17, lower curved portion 35*b* includes a retaining abutment (detent) or hook 39*b* for engaging and coupling clamping portion 45 of tubular clamping member 24 thereto. As seen in FIG. 18, the lower curved portion 35*b* also has another abutment (detent) or tab 40*b* that engages the bottom of adapter 33 to limit the outward movement of adapter 33 relative to second retainer 32*b*.

The retaining abutment 37*b* and 39*b* form a coupling member that is designed to snap-fit onto the upper and bottom parts of clamping portion 24. More specifically, second retainer 32*b* is elastically deformed by the coupling of second retainer 32*b* onto clamping portion 45. Since retaining abutments or hooks 37*b* and 39*b* are relatively small, the amount of resiliency or elastic deformation of second retainer 32*b* does not have to be very large. In other words, second retainer 32*b* can be constructed of a relatively rigid material with a limited amount of resiliency or flexibility. The retaining abutments 37*b* and 39*b* are vertically opposed to each other on their respective portions 34*b* and 35*b*.

Likewise, tabs 38*b* and 40*b* are also vertically opposed to one another. Tabs 38*b* and 40*b* form a coupling member that is designed to snap-fit onto the upper and bottom parts of adapter 33. More specifically, second retainer 32*b* is elastically deformed by the coupling one of the adapters 33 onto second retainer 32*b*. Accordingly, adapter 33 is fixedly secured to second retainer 32*b*, and second retainer 32*b* is in turn fixedly secured to clamping member 24.

As best seen in FIGS. 19–21, adapters 33 are curved or arc-shaped members having a curved inner surface that is designed to engage the seat tube 14 of frame 10. In the first embodiment, adapters 33 have a substantially constant thickness, The thickness of adapters 33 range from approximately 1.5 millimeters to 3.2 millimeters depending upon the frame size. In the case of a seat tube 14 having a diameter of approximately 34.9 millimeters, band adapter 30 would not be utilized. In the case of a medium sized seat tube 14 having a diameter of approximately 31.8 millimeters, the thickness of adapter 33 should be approximately 1.55 millimeters in thickness. In the case of a small size seat tube 14 having a diameter of approximately 28.6 millimeters, the adapters 33 should have a thickness of approximately 3.15 millimeters.

Adapters 33 have a pair of centrally located notches 41 that receive tabs 38*a* and 40*a* of the first retainer 32*a* or receive tabs 38*b* and 40*b* of the second retainer 32*b*. Adapters 33 are secured within the openings of first and second retainers 32*a* and 32*b* by a snap-fit, as discussed above. Preferably, adapters 33 are the same size as the openings in first and second retainers 32*a* and 32*b*.

First ends of clamping portions 44 and 45 are pivotally coupled together by pivot pin 46, which extends in a substantially vertical direction relative to bicycle 10. The other ends of clamping portions 44 and 45 are releasably connected together via fastener 47. Fastener 47 is preferably a screw or bolt that is threaded into a threaded hole of first clamping portion 44. Of course, fastener 47 can be utilized in conjunction with a nut, or the like.

As best seen in FIGS. 4 and 5, second clamping portion 45 includes portions of linkage assembly 28. In other words, portions of linkage assembly 28 are integrally formed with second clamping portion 45, as explained below.

The second clamping portion 45 has a pair of substantially parallel mounting flanges 50 and 52 that extend in substantially vertical directions. Mounting flanges 50 and 52 each have a pivot hole 53 and 54 that receive pivot pins 55*a* and 55*b* for mounting a portion of linkage assembly 28 thereto, as explained below. Mounting flange 50 also has a second pivot hole 56 for receiving pivot pin 57 therein to couple another portion of linkage assembly 28 thereto. As explained below in more detail, flange 50 forms one of the links of linkage assembly 28. Accordingly, flange 50 is a non-movable link.

Referring to FIGS. 3–5, chain guide 26 is preferably constructed of a hard rigid material. For example, chain guide 26 is preferably constructed of metal such as a rigid sheet metal that is bent to the desired shape. Chain guide 26 has a chain receiving slot 60 formed by a pair of vertical shift plates 61 and 62 that are adapted to engage chain 20 for moving chain 20 in a direction transverse to bicycle 10. Shift plates 61 and 62 are connected together by plates 63 and 64. Plate 63 is integrally formed between shift plates 61 and 62. Plate 64 has one end that is integrally formed with shift plate 62 and another end that is detachably coupled to shift plate 61 via screw 65.

As best seen in FIG. 5, chain guide 26 also has a pair of mounting flanges 66 and 67 extending in a substantially horizontal direction from shift plate 61 for coupling linkage assembly 28 thereto. Mounting flange 66 forms one of the links of linkage assembly 28. More specifically, mounting flange 66 has a substantially horizontal section 68 and a substantially vertical section 69. Horizontal section 68 has a pair of threaded holes 70 and 71 for receiving adjustment screws 72 and 73 thereto. Adjustment screw 72 is a low position adjustment screw, while adjustment screw 73 is a high position adjustment screw. Adjustment screws 72 and 73 engage a portion of linkage assembly 28 as discussed below for controlling the range of movement of chain guide 26. In other words, by individually adjusting the axial extension of adjustment screws 72 and 73 relative to horizontal section 68, the retracted (low gear) position and the extended (high gear) position of chain guide 26 are adjusted independently of each other.

A top cover 74 is provided to overlie mounting flanges 66 and 67. Top cover 74 is preferably a non-metallic or plastic member that has a pair of bores 75 and 76. The bores 75 and 76 are initially formed with diameters that are slightly smaller than the thread diameters of adjustment screws 72 and 73. Accordingly, when adjustment screws 72 and 73 are threaded through bores 75 and 76, the non-metallic material is cut or tapped to form internal threads. This creates a friction fit between top cover 74 and adjustment screws 72 and 73. Accordingly, adjustment screws 72 and 73 will typically not move in an axial direction due to vibrations because of this frictional force between top cover 74 and adjustment screws 72 and 73, unless the screws 72 and 73 are manually adjusted by a person.

Vertical section 69 of mounting flange 66 forms one of the links of the linkage assembly 28. Mounting flange 66 has a pair of pivot holes 77 and 78 for pivotally mounting a pair of links of linkage assembly 28 thereto, as discussed below. Mounting flange 67 has a pivot hole 79 that is aligned with pivot hole 78 of vertical section 69 for pivotally coupling a link of linkage assembly 28 therebetween.

Linkage assembly 28 is preferably a four-bar linkage assembly having a first link 81, a second link (vertical section) 69, a third link (mounting flange) 50 and a fourth link 82. First link 81 has its pivot points lying on a line which is substantially parallel to a line that passes through the pivot points of fourth link 82. Similarly, second link (vertical section) 69 has its pivot points lying on a line which is substantially parallel to a line passing through the pivot points of third link (mounting flange) 50.

First link 81 includes a cable attachment member 84 for couple the shift cable 18 thereto. First link 81 is pivotally coupled at one end to second link or vertical section 69 by pivot pin 86. The other end of first link 81 is pivotally coupled to third link or flange 50 of tubular clamping member 24 via pivot pin 57. Accordingly, first link 81 has a pair of spaced pivot holes 88 for receiving pivot pins 86 and 57 therein. First link 81 is preferably secured on pivot pins 86 and 87 by snap-on retaining washers 90. More specifically, pivot pins 86 and 87 each have a groove 92 for receiving retaining washers 90 thereon.

Cable attachment member 84 has a wire clamp 94, a bolt 95 and a nut 96 for attaching the inner wire of cable 18 thereto.

Fourth link 82 is pivotally mounted to second link or vertical section 69 of chain guide 26 via pivot pins 104*a* and 104*b*. Specifically, pivot pins 104*a* and 104*b* are received in pivot holes 78 and 79 of flanges 66 and 67 of chain guide 26. The other end of fourth link 82 is pivotally mounted on pivot pin 55 of third link or mounting flange 50. The upper end of fourth link 82 is provided with a fan-shaped member 105 that engages adjustment screws 72 and 73 for limiting movement of chain guide 26 between its retracted position and its extended position. More specifically, fan member 105 is provided with a low stopping surface 106 and a high stopping surface 107 as best seen in FIGS. 5 and 6. Low stopping surface 106 is designed to engage the free end of low adjustment screw 72, while high stopping surface 107 is positioned to engage the high adjustment screw 73. Since this is a relatively conventional adjustment mechanism that is well known in the prior art, this adjustment mechanism will not be discussed or illustrated in detail herein.

Biasing member 43 is preferably a coil spring that has its coiled portion mounted on pivot pin 57 with a first end engaging a part of mounting flanges 50 and a second end engaging a part of first link 81 for normally biasing chain guide 26 from its extended position to its retracted position. In other words, biasing member or coil spring 43 is a torsion spring that normally urges the cable guide 26 from its extended position to its retracted position. Of course, movement of chain guide 26 is controlled by shifting unit 16 moving cable 18 in a relatively conventional manner.

SECOND EMBODIMENT OF ADAPTERS

Figure 22:
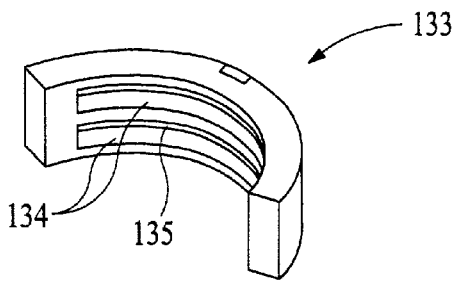
FIG. 22 is a perspective view of an alternate embodiment of an adapter to be utilized with the band adapter illustrated in FIGS. 2–5.
Figure 23:
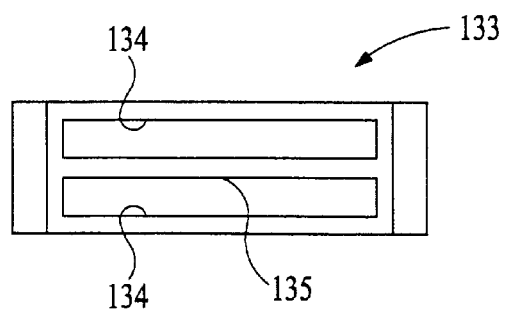
FIG. 23 is an inside elevational view of the adapter illustrated in FIG. 22 in accordance with an alternate embodiment of the present invention.

Referring now to FIGS. 22 and 23, a modified adapter 133 is illustrated in accordance with a second embodiment of the present invention. Basically, adapter 133 is identical to adapter 33 of the first embodiment, except that a pair of longitudinally extending openings 134 are formed therein with a bridge member 135 bisecting adapter 133 to form a pair of equally sized openings 134. Adapter 133 is designed to be utilized with first and second retainers 32a and 32b in substantially the same manner as adapter 33. Therefore, adapter 133 will not be discussed or illustrated in detail herein.

THIRD EMBODIMENT OF RETAINERS

Figure 24:
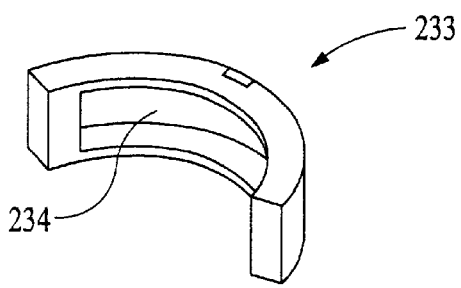
FIG. 24 is a perspective view of another alternate embodiment of an adapter to be utilized with the band adapter illustrated in FIGS. 2–5.
Figure 25:
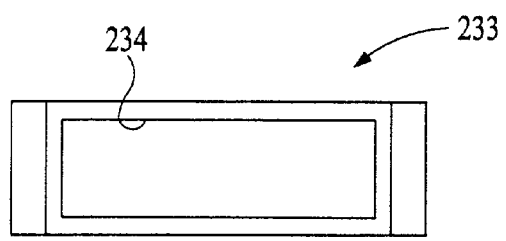
FIG. 25 is an inside elevational view of the adapter illustrated in FIG. 24 in accordance with an alternate embodiment of the present invention.

Referring now to FIGS. 24 and 25, a retainer 233 is illustrated in accordance with the third embodiment of the present invention. Retainer 233 is substantially identical to retainer 133 of the second embodiment, except that the bridge 135 has been removed from this embodiment such that a single large longitudinally extending opening 234 is formed therein. Similar to the second embodiment, adapter 233 is designed to be utilized with either retainers 32a or 32b of the first embodiment. Therefore, retainer 233 will not be discussed or illustrated in detail herein.

While several embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A front derailleur for a bicycle, comprising:
   a tubular clamping member with an effective clamping diameter that is adapted to be coupled to a portion of the bicycle;
   an adapter member for decreasing said effective clamping diameter of said tubular clamping member, said adapter member having an outer surface and a curved inner surface with a predetermined radius of curvature;
   a retaining member having a coupling member to fixedly secure said retaining member to said tubular clamping member;
   a chain guide having a chain receiving slot to shift a chain of the bicycle in a transverse direction; and
   a linkage assembly coupled between said tubular clamping member and said chain guide to move said chain guide between a retracted position and an extended position.

2. A front derailleur for a bicycle according to claim 1, wherein
   said adapting member includes a first adapter with a first curved portion of said curved inner surface and a second adapter with a second curved portion of said curved inner surface, said second adapter being separate from said first adapter.

3. A front derailleur for a bicycle according to claim 2, wherein
   said retaining member includes a first retainer with said first adapter coupled thereto and a second retainer with said second adapter coupled thereto, said second retainer being separate from said first retainer.

4. A front derailleur for a bicycle according to claim 3, wherein
   said first and second adapters being constructed of a metallic material.

5. A front derailleur for a bicycle according to claim 4, wherein
   said metallic material is aluminum.

6. A front derailleur for a bicycle according to claim 4, wherein
   said first and second adapters have a non-smooth surface along said curved inner surface.

7. A front derailleur for a bicycle according to claim 4, wherein
   said first and second adapters have a smooth surface along said curved inner surface.

8. A front derailleur for a bicycle according to 4, wherein
   each of said first and second adapters includes at least one opening therein.

9. A front derailleur for a bicycle according to claim 8, wherein
   each of said first and second adapters includes at least two of said openings therein.

10. A front derailleur for a bicycle according to claim 4, wherein
    said first and second retainers are constructed of a non-metallic material.

11. A front derailleur for a bicycle according to claim 10, wherein
    each of said first and second retainers has a recess sized to receive its respective one of said first and second adapters.

12. A front derailleur for a bicycle according to claim 10, wherein
    said coupling member includes a pair of detents formed on each of said first and second retainers.

13. A front derailleur for a bicycle according to claim 12, wherein
    at least one of said detents on each of said first and second retainers is elastically deformable.

14. A front derailleur for a bicycle according to claim 13, wherein
    each of said first and second retainers has a recess sized to receive its respective one of said first and second adapters.

15. A front derailleur for a bicycle according to claim 14, wherein
    each of said first and second adapters includes at least one opening.

16. A front derailleur for a bicycle according to claim 2, wherein
    each of said first and second adapters has a predetermined effective thickness ranging from approximately 1.5 millimeters to approximately 3.2 millimeters for extending laterally inward from said tubular clamping member to decrease said effective clamping diameter of said tubular clamping member.

* * * * *

UNITED STATES PATENT AND TRADEMARK OFFICE
CERTIFICATE OF CORRECTION

PATENT NO.   : 6,146,298
DATED        : May 12, 2004
INVENTOR(S)  : Yoshiaki Nanko It is certified that error appears in the above-identified patent and that said Letters Patent is hereby corrected as shown below:

Drawings,
Figure 5, the reference numeral "6" and its lead line should be deleted.

Column 5,
Line 12, "planting" should read -- clamping --.

Column 8,
Lines 39 and 40, "87" should read -- 57 --.
Lines 51, "pin 55" should read -- pins 55a and 55b --.

Signed and Sealed this

Sixth Day of July, 2004

JON W. DUDAS
*Acting Director of the United States Patent and Trademark Office*